(12) United States Patent
Nilsson et al.

(10) Patent No.: US 9,436,983 B2
(45) Date of Patent: Sep. 6, 2016

(54) SYSTEMS AND METHODS FOR NON-LINEAR PROCESSING OF IMAGE FRAMES

(71) Applicant: nLightn, Inc., Concord, CA (US)

(72) Inventors: Mikael Nilsson, Lund (SE); To Tran, Arlöv (SE); Börje Anders Hellsberg, Malmö (SE); James Frank Thomas, Concord, CA (US)

(73) Assignee: nLightn, Inc., Concord, CT (US)

(*) Notice: Subject to any disclaimer, the term of this patent is extended or adjusted under 35 U.S.C. 154(b) by 253 days.

(21) Appl. No.: 14/304,773

(22) Filed: Jun. 13, 2014

(65) Prior Publication Data

US 2014/0369598 A1    Dec. 18, 2014

Related U.S. Application Data

(60) Provisional application No. 61/835,439, filed on Jun. 14, 2013.

(51) Int. Cl.
   *G06K 9/00* (2006.01)
   *G06T 5/40* (2006.01)
   *G06T 5/50* (2006.01)

(52) U.S. Cl.
   CPC . *G06T 5/40* (2013.01); *G06T 5/50* (2013.01); *G06T 2207/10024* (2013.01)

(58) Field of Classification Search
   CPC .. G06T 5/40; G06T 5/50; G06T 2207/10024
   USPC ........................................ 382/162, 103, 104
   See application file for complete search history.

(56) References Cited

U.S. PATENT DOCUMENTS

| 2014/0270381 A1* | 9/2014 | Wu ..................... G06K 9/00785 382/104 |
| 2014/0376769 A1* | 12/2014 | Bulan ................ G06K 9/00771 382/103 |
| 2015/0278609 A1* | 10/2015 | Wu ..................... G06K 9/00785 382/104 |
| 2015/0286884 A1* | 10/2015 | Xu ..................... G06K 9/00845 382/103 |
| 2015/0286885 A1* | 10/2015 | Bulan .................. G06K 9/4642 382/104 |

OTHER PUBLICATIONS

Mikael Nilsson et al., "Gray-scale image enhancement using the SMQT" IEEE International Conference on Image Processing 2005 (vol. 1 )Date of Conference:Sep. 11-14, 2005, pp. 5.*
Nilsson, M. et al., "Gray-scale image enhancement using the SMQT" in *ICIP* (1), pp. 933-936, Sep. 11, 2005.

(Continued)

*Primary Examiner* — Mekonen Bekele
(74) *Attorney, Agent, or Firm* — Perkins Coie LLP

(57) ABSTRACT

Embodiments of the present disclosure include systems and methods for image processing for enhancing, e.g., photos, videos, and graphics representations. Particularly, some embodiments perform a histogram-based SMQT decomposition of various attributes in an original image. The SMQT decomposition of these attributes may then be used to create a look-up-table indicating how to modify pixel attributes in the same or a subsequent image so as to enhance the same or subsequent image. The results of the SMQT decomposition for each attribute may be interpolated based, e.g., on user preferences, to achieve a more optimal enhancement.

21 Claims, 16 Drawing Sheets
(1 of 16 Drawing Sheet(s) Filed in Color)

(56) References Cited

OTHER PUBLICATIONS

Nilsson, M., "SMQT-based Tone Mapping Operators for High Dynamic Range Images" "VISAPP 2013—Proceedings of the International Conference on Computer Vision Theory and Applications", vol. 1, Barcelona, Spain, Feb. 21-24, 2013. SciTePress 2013 ISBN 978-989-8565-47-1.

Nilsson, M. et al., "The successive mean quantization transform" In *Acoustics, Speech, and Signal Processing, 2005. Proceedings. (ICASSP), IEEE International Conference on*, vol. 4, pp. iv-429, IEEE, Mar. 19, 2005.

Nilsson, M. et al., "Gray-scale image enhancement using the SMQT" In *ICIP* (1), pp. 933-936, 2005.

Nilsson, M., "SMQT-based Tone Mapping Operators for High Dynamic Range Images" In *8th International Conference on Computer Vision Theory and Applications* (*VISAPP 2013*), SciTePress, 8 pp., 2013.

Nilsson, M. et al., "The successive mean quantization transform" In *Acoustics, Speech, and Signal Processing, 2005. Proceedings. (ICASSP'05), IEEE International Conference on*, vol. 4, pp. iv-429, IEEE, 2005.

\* cited by examiner

SYSTEMS AND METHODS FOR NON-LINEAR PROCESSING OF IMAGE FRAMES

CROSS REFERENCE TO RELATED APPLICATIONS

This application is entitled to the benefit of and claims priority to U.S. Provisional Patent Application No. 61/835,439, entitled "SYSTEMS AND METHODS FOR NON-LINEAR PROCESSING OF IMAGE FRAMES" filed Jun. 14, 2013, the contents of which are incorporated herein by reference in their entirety for all purposes.

FIELD

The disclosed embodiments relate to image processing systems for enhancing photos, videos, and graphics representations.

BACKGROUND

The electronics market offers a wide variety of digital devices having different image capture and display capabilities. Parameters selected to optimize image capture for one device may produce an image which is not optimized for display on another device. Even if an image capture system attempts to anticipate this disparity, the wide variation in lighting conditions in different environments can make it intractable to optimize the image ex ante for a given display. In some circumstances, e.g., underwater imaging, it may simply not be possible to acquire an image with the available hardware and lighting conditions such that it will be optimally displayed on a user device. Even if a solution were identified, many applications, e.g., streaming video, require rapid and possibly real-time image enhancement. These demands make solutions, however effective, intractable if they cannot perform image enhancement quickly. Accordingly, there exists a need for quick and effective image optimization despite disparate lighting and image capture hardware conditions.

BRIEF DESCRIPTION OF THE DRAWINGS

The patent or application file contains at least one drawing executed in color. Copies of this patent or patent application publication with color drawing(s) will be provided by the Office upon request and payment of the necessary fee. One or more embodiments of the present disclosure are illustrated by way of example and not limitation in the figures of the accompanying drawings, in which like references indicate similar elements.

Figure 1:
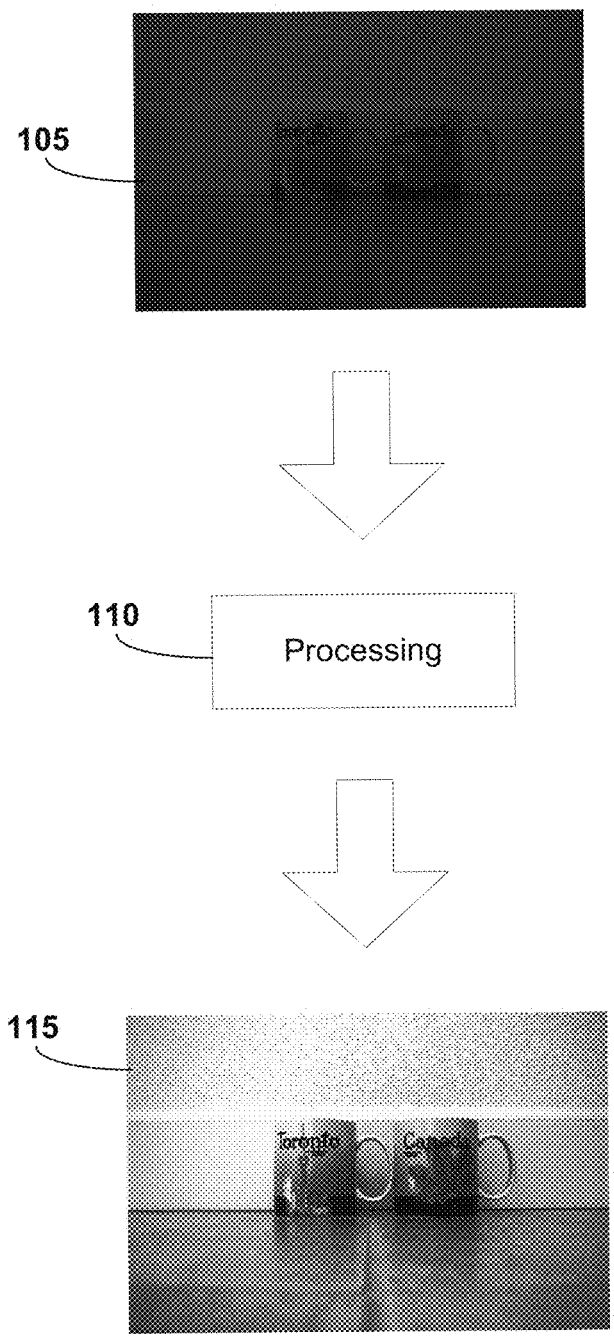
FIG. 1 is a high level overview of the imaging processing methods described in some embodiments disclosed herein.

Those skilled in the art will appreciate that the logic and process steps illustrated in the various flow diagrams discussed below may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed and/or encrypted; etc.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

System and Image Processing Overview

Embodiments of the present disclosure include systems and methods for enhancing photos, videos, and graphics representations. FIG. 1 is a high level overview of the imaging processing methods described in some embodiments disclosed herein. An initial image 105 may lack various desired characteristics, e.g., the desired hue and/or luminance. These deficiencies may be a consequences of the image capture device's limitations, the lighting of the scene in which the image was taken, quality deterioration in storage, etc. By applying various of the processing systems and techniques 110 disclosed herein an image 115 having the desired properties may be produced. Processing 110 may rely on parameter inputs (e.g. an interpolation parameter as discussed herein) from a human user, from a cache, from a machine learning system, etc. Processing 110 may be applied to a single image or to multiple images, e.g., in an image stream such as MPEG. The system may receive the image 105, e.g., streamed from a camera device or stored as a file on disk. The source of the frame can be a photo camera, video camera, web cam, head-mounted device, a mobile phone, a smartphone, embedded memory device, remote server, etc.

Processing 110 may be implemented in software, firmware, or hardware and may be found, e.g., in a general purpose computer (e.g., a handheld user device) or in a hardware processing component (e.g., a Field Programmable Gate Array). Though the images 105, 115 depicted in this example are RGB images, one will recognize that grayscale images may also be used, as well as images including depth values, non-light based images (e.g., ultrasound), etc.

Linear and Non-Linear Look Up Tables

Figure 2:
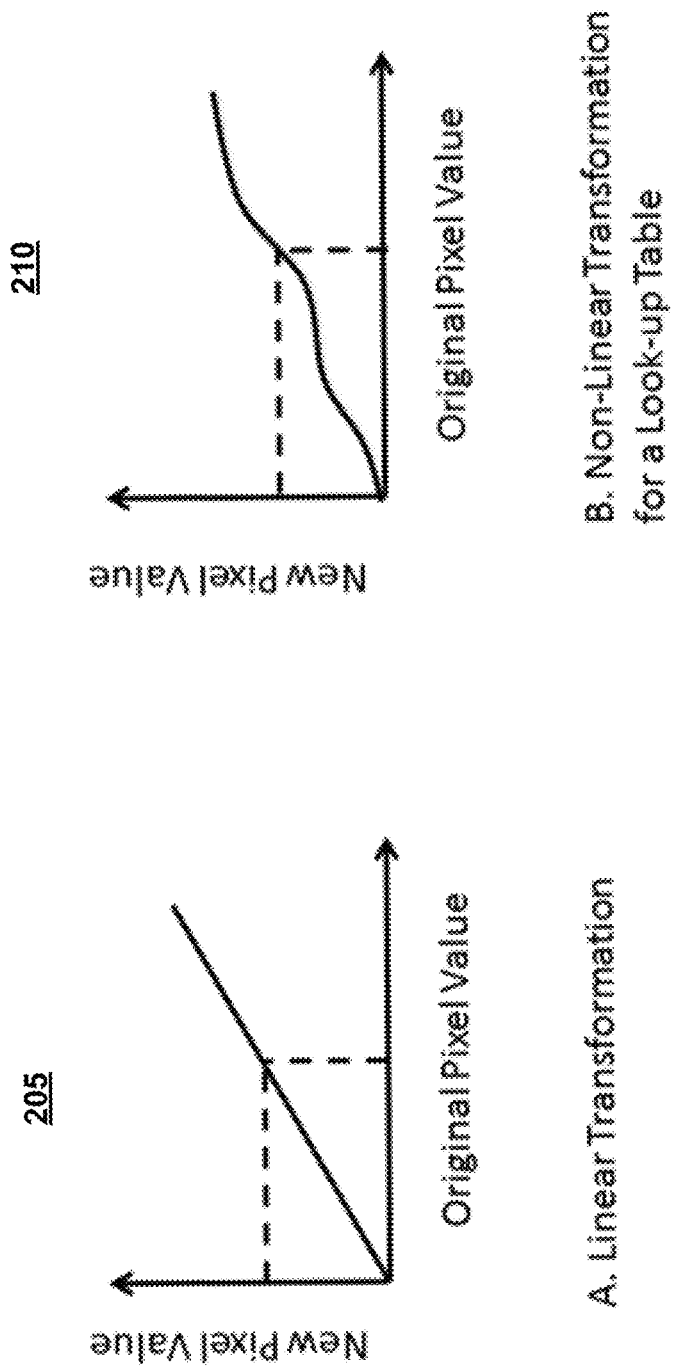
FIG. 2 is a comparison of the linear and non-linear transformations as may apply in some embodiments.

FIG. 2 is a comparison of the linear 205 and non-linear 210 transformations as may apply in some embodiments. The linear process may be computationally direct because it multiplies each original input pixel value by the same pre-defined co-efficient $\alpha$ (e.g., a look-up-table (LUT) may not even be necessary as $\alpha$ is universally applied). The technique can be used to distribute original values over a greater range, e.g. increase or decrease luminance for the original picture. An example of a linear process would be multiplying a input pixel by $\alpha$ in order to distribute original values over a greater range, e.g. increase or decrease luminance for the original picture. For example, an image 115 may be generated by simply applying the coefficient $\alpha$ to each pixel in image 105.

Although not computationally intensive, the linear approach may not produce high-quality enhanced images because it may not take into account real-time lighting conditions or capture device characteristics that require different adjustments for different ranges of pixel values. For example, in low-lighting conditions one may want to enhance low luminance pixels to a greater degree than high-luminance pixels. In another example, in an underwater image capture one may want to de-emphasize deep green pixel values. In a yet another example, an imaging system coupled to a robotic surgery device (e.g. da Vinci® Surgical System) may need to be adapted to de-emphasize certain red pixels to adjust for a patient's blood. On the other hand, non-linear processes may be good for fine-tuning image enhancement, but may require high processing power, especially when used in real-time. For mobile devices, such as smartphones, this may also imply more power consumption, which may decrease the usefulness of the technique.

Accordingly, various embodiments contemplate the generation of LUTs using a histogram-based Successive Mean Quantization Transform (SMQT) approach. These LUTs may provide non-linear transforms 210 to accommodate complicated lighting conditions, but may also operate quickly, providing, e.g., an output RGB value (image 115) for a given input RGB value (image 105).

Example Initial Image Processing Overview

Figure 3:
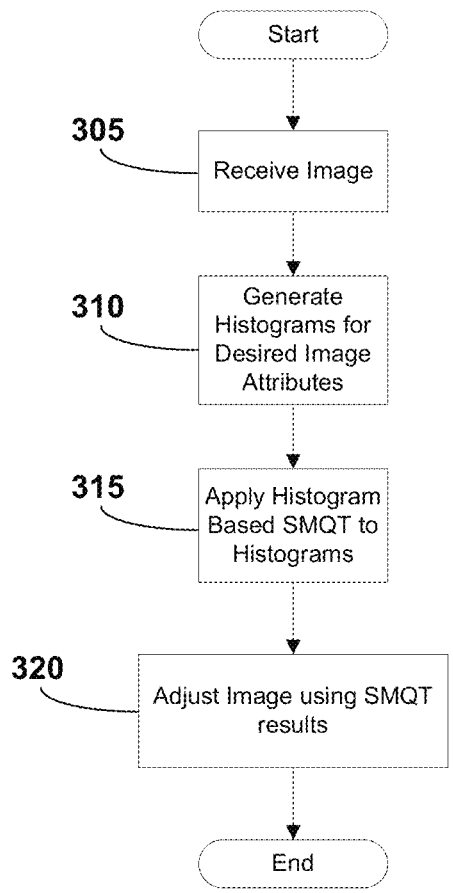
FIG. 3 is a flow diagram depicting a high level process for adjusting a single image as disclosed in some embodiments.

FIG. 3 is a flow diagram depicting a high level process for adjusting a single image as disclosed in some embodiments. The process 300 may achieve improved and more efficient image optimization by generating lookup tables (LUTs) for various attributes following a histogram-based Successive Mean Quantization Transform (SMQT). These tables may be interpolated with one another, e.g., taking weighted averages, to generate an optimal output image. In this manner, the process 300 may achieve rapid and effective image adjustment. In this example, a single image is received and processed.

At block 305, the system may receive an image, e.g., following image capture using a camera on a user device. At block 310, the system may generate one or more histogram representations of various attributes in the image. For example, where the image is an RGB image a histogram may be generated for the red pixel values, a histogram for the green pixel values, and a histogram for the blue pixel values. In some embodiments, histograms may also be generated for intermediate attributes not directly evident from the image. For example, given an RGB image, the luminance values of the pixels may be determined and a corresponding histogram generated. One will recognize that the histogram will depict the number of pixels in the image associated with a common value for the attribute.

At block 315, the system may apply histogram-based SMQT, as discussed herein, to the attributes. By using histograms, rather than applying an SMQT to the raw image, the system may achieve considerable efficiency gains. For example, an image with a height and width of 1024 pixels will contain 1,048,576 individual pixels. Iterating over each of these pixels at each level of the SMQT would be very, very expensive. In contrast, assuming the channels are represented with 8 bits, the corresponding red histogram will contain only 256 values (the number of pixel counts residing in each of the $2^8$=256 histogram bins). Considering 256 values, rather than 1,048,576, at each level of the SMQT is much more efficient.

At block 320, the system may adjust the image based upon the SMQT results. In some embodiments, the system may store the results of the SMQTs for each attribute as separate tables. The system may then iterate over the attribute values for each pixel in the original image, determine the corresponding adjusted value in the corresponding SMQT table, and substitute the corresponding value. Though tables provide one means for storing the SMQT results, one will recognize other methods for storing the results, e.g., generating a mapping function. The image adjustment may take a weighted average of the corresponding values in different tables in some embodiments. For example, where histogram-based SMQT operations have been performed for each of the red, green, blue, and luminance values in the image, at block 320 the system may modify, e.g., each red value in the original image by taking a weighted average of the corresponding red SMQT value for that pixel and the red value derived from the SMQT luminance value for that pixel.

Example Multi-Image Processing Overview

Figure 4:
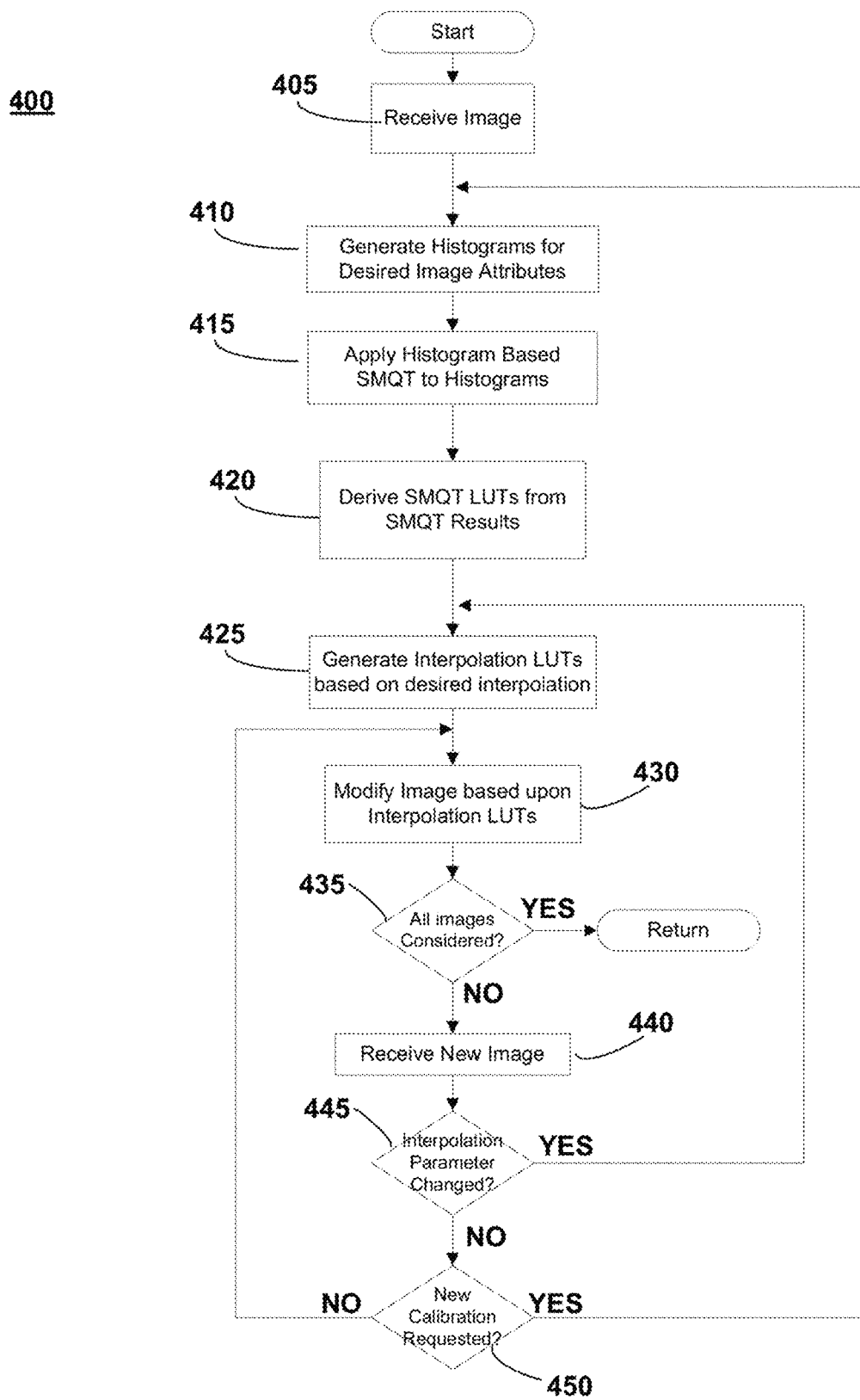
FIG. 4 is a flow diagram depicting a high level process for adjusting multiple images as disclosed in some embodiments.

FIG. 4 is a flow diagram depicting a high level process 400 for adjusting multiple images as disclosed in some embodiments. The process 400 may be applied, e.g., where a user takes successive images using a handheld device, captures video using the device, or receives streaming video. At block 405, the system receives an image. At block 410, the system generates histograms for the desired image attributes (e.g., red, green, blue, luminance, etc.). As discussed in greater detail herein, the system may use less than all of the pixels in the image to construct the histograms and LUTs (e.g., by selecting a translated pattern of pixels). At block 415, the system may apply histogram-based SMQT to each attribute. At block 420, the system may store the results of the SMQT processing in LUTs.

As discussed above, the optimal image adjustment may be achieved in some embodiments by taking the weighted average of different LUT outputs for different attributes (e.g., averaging the luminance and green channel attributes' results). While the system could proceed to adjust images by retrieving values from the SMQT LUTs and taking their weighted averaged directly, this may not be very efficient. Accordingly, at block 425 the system may generate "Interpolation LUTs" using the SMQT LUTs and the presently specified interpolation parameter. For example, if the specified interpolation parameter indicated that the original red pixel values were to be adjusted in equal measure based on the red SMQT LUT and the luminance SMQT LUT (e.g., the parameter=0.5), the system could proceed to generate an interpolation table indicating the resultant value for each of the entries in the red SMQT LUT and the luminance SMQT LUT. That is, for an original red value of 156, the red SMQT LUT may indicate a value of 100. For the pixel in which the original red value 156 is found, the LUT table may indicate a corresponding red component of 100. The interpolated LUT may then indicate that for an original red value of 156, the value of 128 (i.e., 156*0.5+100*0.5) should be substituted. In this manner, the interpolated LUT can speed processing by skipping the collection of the LUT values from the individual SMQT tables and the application of the current interpolation parameter value.

In some embodiments, a user or the system may determine coefficients used to create the final look-up table (LUT-f). An example formula for the final interpolation table may be calculated, e.g., as follows in some embodiments:

$$LUT\text{-}fx = a*LUT\text{-}O + b*LUT\text{-}x + c*LUT\text{-}L,$$

where a, b, and c are weights applied to look-up tables generated for the original image frame (LUT-O), the channel X (LUT-x, where x can be Red, Green, Blue or Luminance), and Luminance (LUT-L) channel. The coefficients, a, b and c, may be used to fine-tune the enhancement algorithm to various external conditions, characteristics of the image capture device, the object(s) in the image, etc. Examples of such characteristics may include ISO, Exposure, Aperture, device location (GPS coordinates), white balance, Macro mode, Time and Date of the capture, Scene, Faces, use of flash, etc.

The coefficients may be pre-calculated to match a specific device or system, e.g. smartphone or an application. In some implementations, the coefficients may be derived experimentally, e.g. by calibrating the camera and adjusting the images to be perceived of being of higher quality by the testers. In other implementations, the user of the system or third parties (e.g. manufacturers), may adjust the coefficients manually during pre- and/or post-processing of the images. For example, when used in a banking check-deposit application, the coefficients may be adjusted to provide higher contrast for currency values and/or security watermarks.

At block 430, the system may iterate over the pixels of the image and modify the image, or generate a new image, using the interpolation LUTs. At block 435, the system may consider if all images have been considered (e.g., the user turns off a handheld camera, a streaming movie ends, etc.). If images remain, the system may receive the next image at block 440. At block 445, the system may determine if the interpolation parameter has changed. For example, the user may have specified that they prefer the images to be processed with a different interpolation parameter value (more luminance contribution, less RGB contribution, more original image contribution, etc.). In some embodiments, the system may perform the adjustment automatically, e.g., using machine learning techniques to recognize patterns in user preferences. For example, the system may have previously determined based on user training data that users prefer an interpolation value of 0.75 when viewing darkly lit aquatic environments (based, e.g., on the characteristic hue values of a darkly lit aquatic environment). When a movie changes from a well-lit aquatic environment to a scene with a darkly lit aquatic environment, the system may recognize the correspondence between the darkly lit aquatic environment and the training data. Accordingly, the system would adjust the interpolation value to 0.75 to agree with the expected user preferences.

Similarly, at block 450, the user or system may request that a new calibration be performed for the current image. Continuing the above "aquatic" example, adjustment in interpolation values may suffice to optimize relatively similar images (well and darkly lit aquatic environments). However, if the scene changes drastically, e.g., from a well-lit indoor environment to a darkly lit aquatic environment, it may be necessary to acquire new SMQT LUTs to perform suitable transformations. One will readily recognize variations, mutatis mutandis (e.g., where a new calibration is performed when an ultrasound reading transitions from one portion of a body to another).

Successive Mean Quantization Transform (SMQT)

Figure 5:
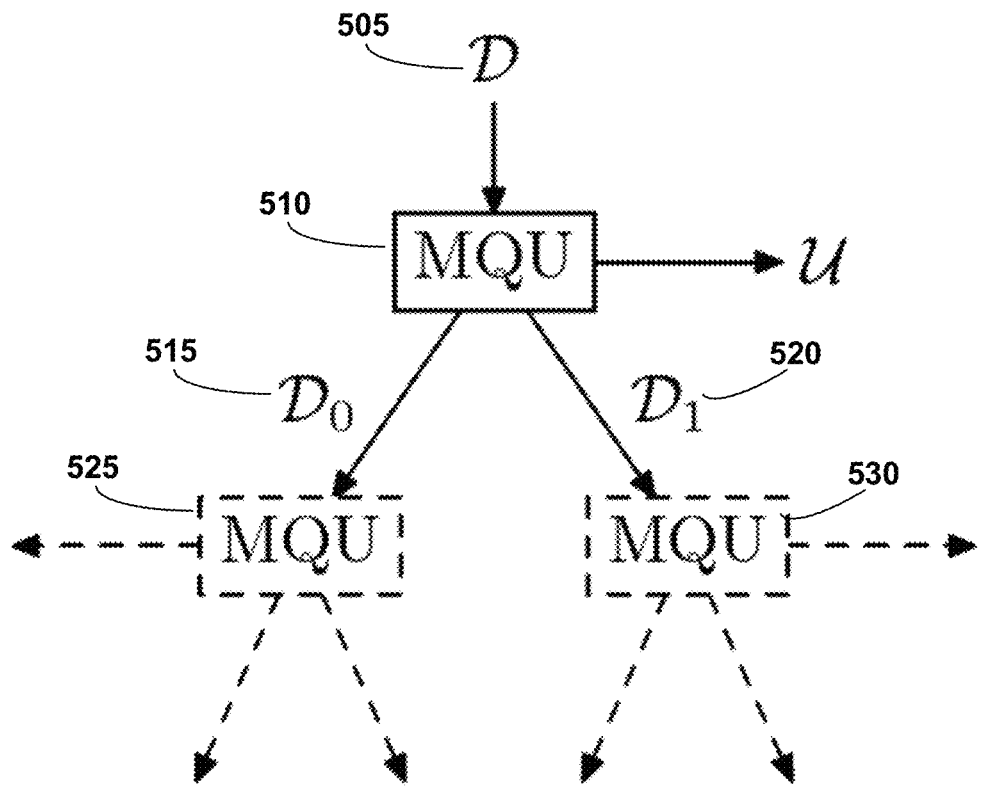
FIG. 5 is a block diagram of an example Mean Quantization Unit (MQU) block in an example Successive Mean Quantization Transform (SMQT) operation as may be used in some embodiments.

As discussed herein, the SMQT may be used to generate a nonlinear LUT for subsequent image enhancement. The SMQT may subdivide a collection of values by iteratively identifying subsets among the values based upon the collection's mean. Each mean-based subdivision may be reflected graphically as a Mean Quantization Unit (MQU). FIG. 5 is a block diagram of an example Mean Quantization Unit (MQU) block in an example SMQT operation as may be used in some embodiments. An incoming collection D 505 may comprise a number of values. The MQU 510 may determine the mean of these values and split the incoming collection D 505 into a first subdivision $D_0$ 515 including values below the mean and a second subdivision $D_1$ 520 including values above the mean. These subdivisions may then be applied as the incoming collections to new MQUs 525, 530 to further subdivide the collection.

Figure 6:
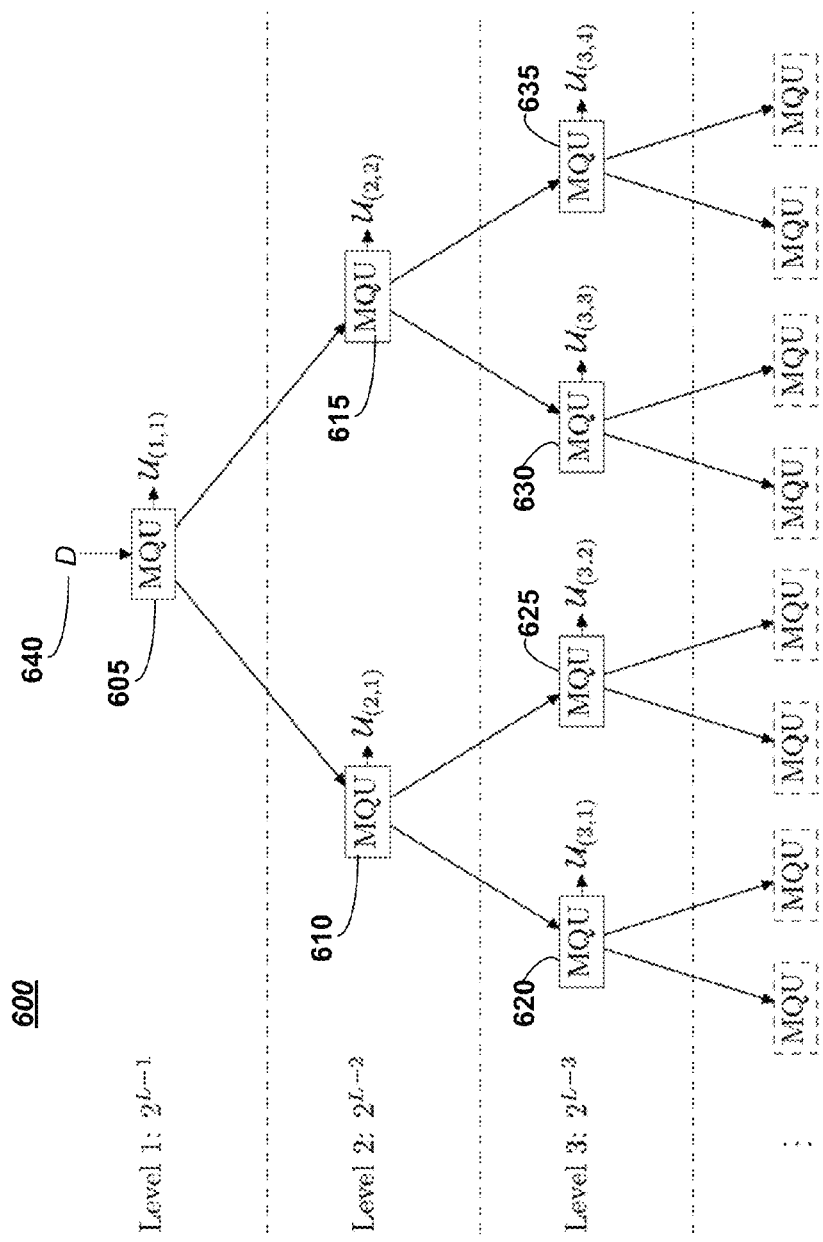
FIG. 6 is a block diagram of an example SMQT tree as may be used in some embodiments.

FIG. 6 is a block diagram of an example SMQT tree as may be used in some embodiments. An initial collection D 640 may be presented to the MQU 605 in the first level. MQU 605 may identify the mean and generate appropriate subdivisions which are passed to MQUs 610 and 615. MQUs 610 and 615 thus comprise the second level. Though divisions about a mean are depicted here for ease of comprehension, one will recognize that divisions of more than two are possible at each MQU (e.g., dividing the collection into thirds). MQUs 620, 625, 630, and 635 comprise the third level. The levels may continue until a desired number of subdivisions have been reached. The results of the subdivisions may then be used to indicate "buckets". Each bucket may be used to identify the output in the LUT to correspond to a given input.

Figure 7:
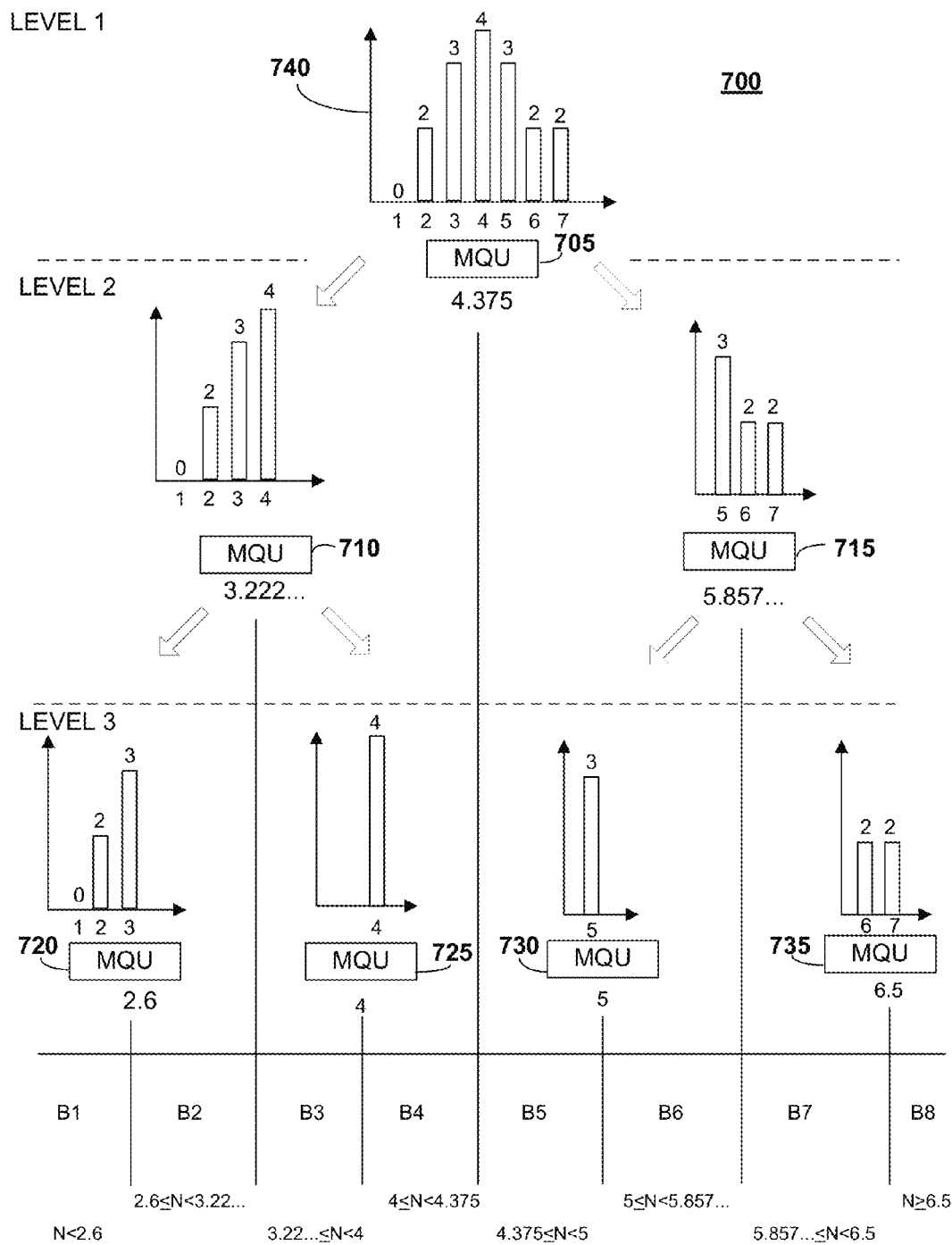
FIG. 7 illustrates an example application of a histogram-based SMQT tree as may occur in some embodiments.

FIG. 7 illustrates an example application 700 of a histogram-based SMQT tree as may occur in some embodiments. In this simplified example, an image has 16 pixels, each pixel associated with an attribute value (e.g., blue) taking on one of 7 values (one will recognize that an image may have many more pixels and the attribute many more than 7 values—FIG. 7 merely presents an example idealization to facilitate understanding). In this example, the system has generated the histogram 740 for the attribute values in the image (i.e., 0 pixels have the "1" attribute value, 2 pixels have the "2" attribute value, etc.). Based on the distribution, MQU 705 determines a mean value of 4.375 (i.e., (1*0+ 2*2+3*3+4*4+5*3+6*2+7*2)/16=4.375). Based on this mean value, the histogram is divided into appropriate subdivisions and submitted to MQUs 710 and 715 (as discussed above, one will recognize that the graphical depiction here is merely for explanation and the same MQU software/firmware/hardware may, e.g., be reused in some implementations to process each successive level, MQUs may be operated in parallel, etc.).

MQU 710, e.g., considers the values falling below the 4.375 mean and determines that a mean value of 3.222 . . . applies to its subdivision. MQU 715 makes a similar determination and Level 3 subdivisions are generated and supplied to MQUs 720, 725, 730, and 735. In this example, there are only three levels and consequently, the means determined at MQUs 720, 725, 730, and 735 are the last. Each of the determined means are then used to identify boundaries between bins B1-B8. For example, an original pixel attribute value associated with the value 3 would be placed in bin B2 as B2 corresponds to values between 2.6 and 3.22 . . . . Similarly, an original value of 6 would now be associated with bin B7. Though some bin divisions are identified as "less than or equal" or "greater than or equal" one will recognize that the inclusion of the boundary is a design choice and need not be as depicted here in every embodiment (for example, an input of 5 may fall into bin B5 rather than B6 in some embodiments).

Figure 8:
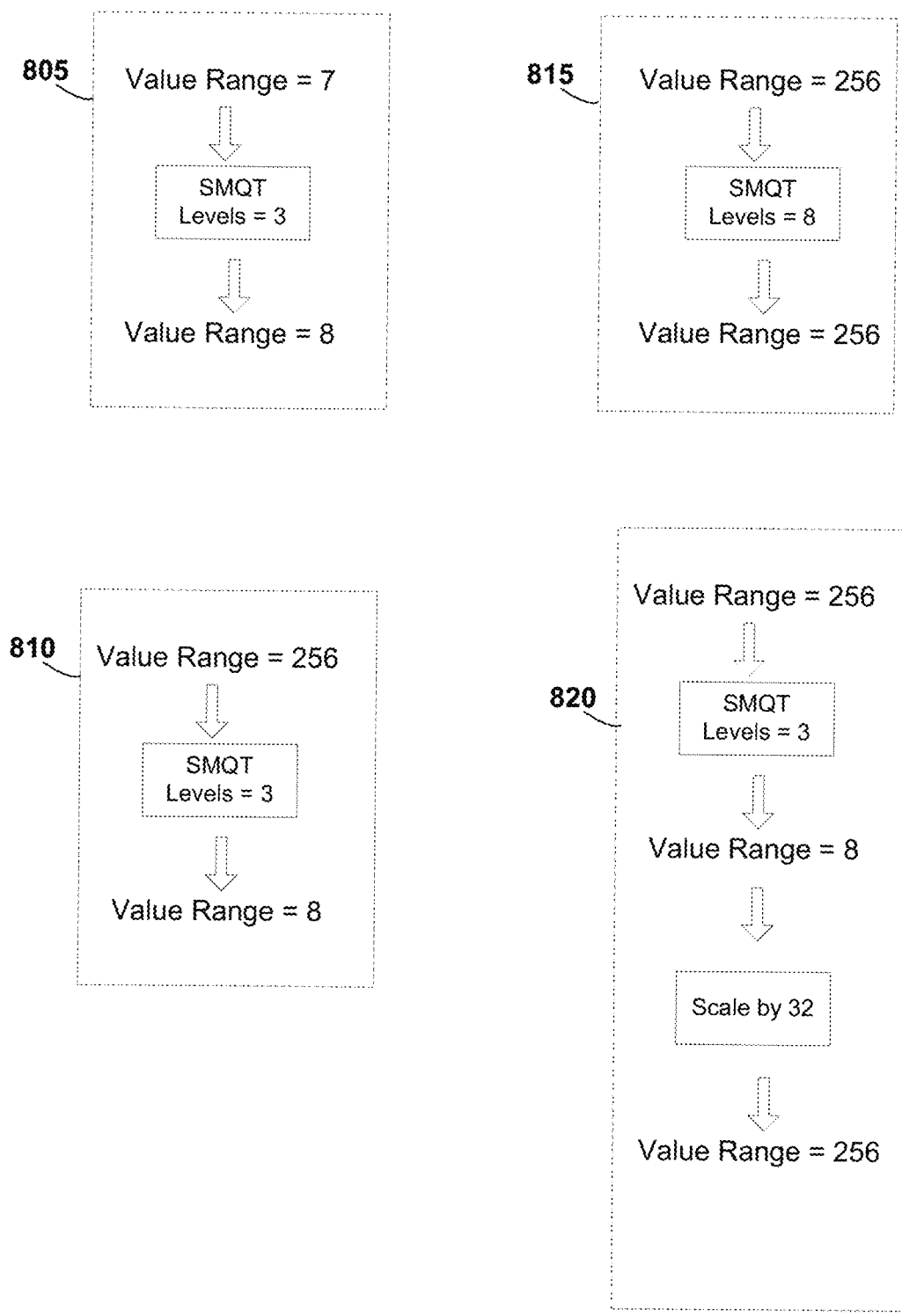
FIG. 8 illustrates various compression and scaling approaches that may be applied in some embodiments.

In the example of FIG. 7, only eight bins were determined. The number of bins generated may vary depending upon the application. For example, FIG. 8 illustrates various compression and scaling approaches that may be applied in some embodiments. For example, approach 805 reflects the example of FIG. 7 where a range of 7 possible values, applied to an SMQT comprising 3 levels, generates a value range of 8 possible bins. Similarly, in approach 810 an image with an initially high value range of 256 has been reduced to an image having values in only one of 8 bins.

In some embodiments each bin may be associated with a value in the 256 range e.g., by scaling as in approach 820. That is, a value in the first bin may correspond to 0, the second bin 32, the third bin 64, etc. In some embodiments, the system instead uses a number of levels corresponding to the input value range. For example, in approach 815, the system uses 8 SMQT levels so that the number of bins (256) corresponds to the 256 input value range. The number of levels may be adjustable in the system depending on the embodiment, e.g., to accommodate different desired levels of processing.

Thus, in some embodiments, for 12 bit sensors the SMQT algorithm may be used to reduce the bit-depth with full 12-bit high dynamic range content, and at the same time color enhance the image. Certain embodiments go from a lower bit-depth to a higher bit-depth. In some embodiments, the SMQT tree has 8 levels to accommodate for 8-bits per pixel. In some embodiments the tree can have fewer or more levels, depending on the computing power and picture enhancement requirements for the device. Generally, fewer levels may require less computation. For example, in a real-time security camera application in order to speed up computations the system may reduce the tree depth to 4 levels. At the same time, the system may store original frames for post-processing and comparison with the reduced tree version.

Some embodiments may enable frame processing systems to handle all practical combinations of bit depths in image input and output, depending on the system's technical constraints, input images, and output applications. As a result, a custom LUT can be created in some embodiments for each channel efficiently, possibly in real time, based on a specific input histogram.

Figure 9:
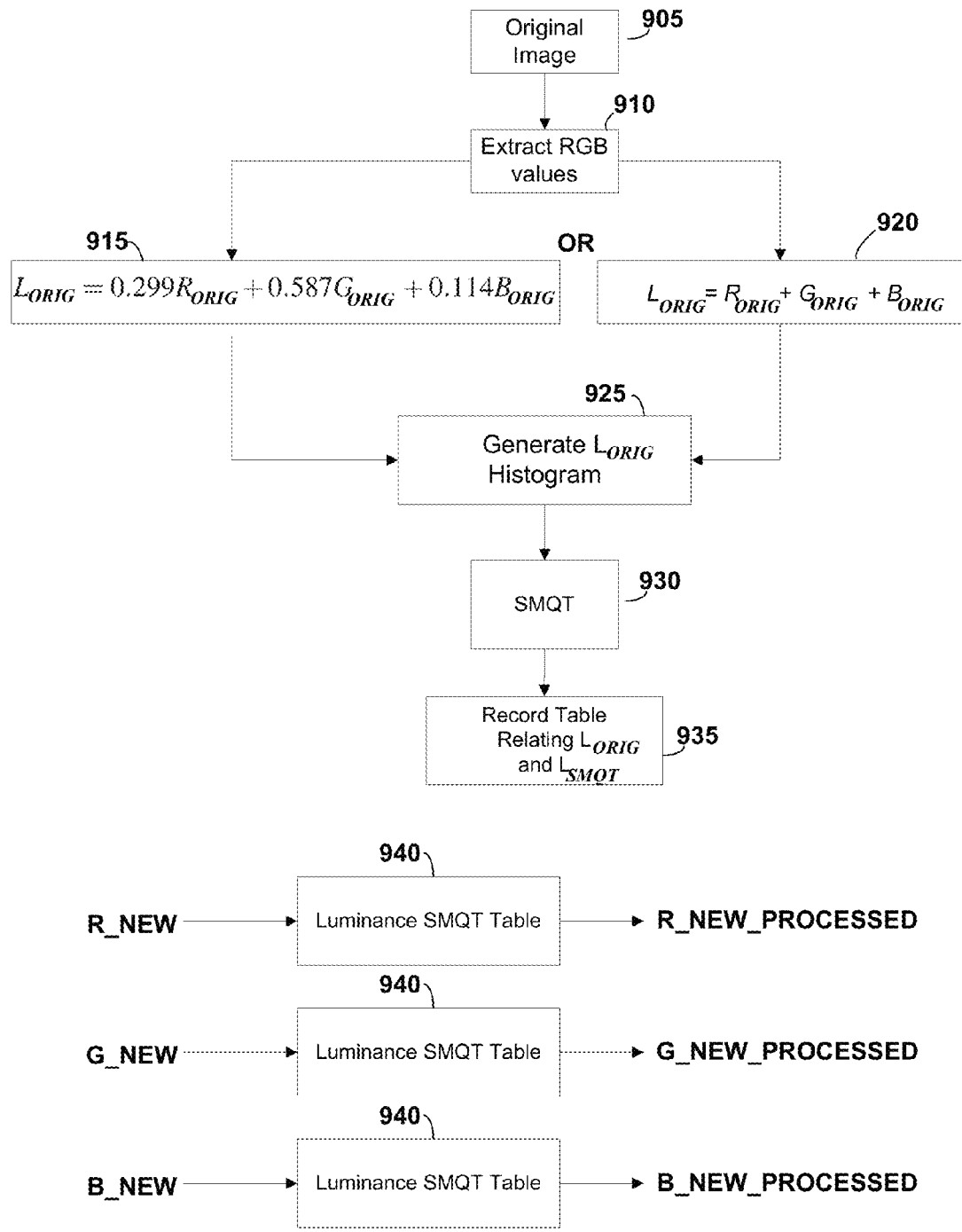
FIG. 9 illustrates a process for determining a luminance conversion as may be applied in conjunction with the SMQT in some embodiments.

FIG. 9 illustrates a process for determining a luminance conversion as may be applied in conjunction with the SMQT in some embodiments. As discussed herein, the system may interpolate between SMQT results for different attributes to determine how to modify the attribute for a given image pixel. When working with luminance, the system may proceed as indicated in FIG. 9. At block 905, the system may consider a pixel from an original image (e.g., a calibration image). At block 910, the system may extract the RGB values from the pixel, represented here as $R_{ORIG}$, $G_{ORIG}$, $B_{ORIG}$. One will recognize many ways to determine a luminance (and other attributes) based upon these values. For example, in some embodiments, these values may be used to generate a luminance value $L_{ORIG}$ via the equation 915. In some embodiments, a more informal determination may be made by summing the RGB values as in the equation 920. Generally, a table would be created using only one of the approaches 915, 920 to luminance determination. Once the system has determined $L_{ORIG}$ values for each pixel, it may generate a histogram at block 925. Using the histogram, the system may apply the SMQT at block 930 as described herein. For each of the original luminance values $L_{ORIG}$ the SMQT may now identify a corresponding luminance value, represented here by $L_{SMQT}$, via the corresponding SMQT bin. In some embodiments, the correspondence between $L_{ORIG}$ and $L_{SMQT}$ may be stored directly in a table at 935.

When a new RGB pixel value is received, each red, green, or blue subcomponent may be individually passed through the luminance SMQT table to determine the corresponding red, green, and blue output value. For example, a new red value "R_NEW" may be passed through the luminance SMQT table 940 to produce an output "R_NEW_PROCESSED" value. The green and blue subcomponents may likewise be passed through the same luminance table. Accordingly, in some embodiments where the luminance SMQT results may be interpolated with the red, green, and blue histogram SMQT results, each RGB subcomponent may be addressed individually. For example, where the interpolation value between the luminance and RGB tables is 0.8 (i.e., 80% from the luminance table and 20% from the RGB table), if a new image's red attribute value is, e.g., 155, and corresponds to a luminance SMQT table output value of 120, and a red SMQT output value of 140, the resulting interpolated output value will be 124 (i.e., 0.8*120+ 0.2*140).

Histogram, Table, and Interpolation-Based Processing

Figure 10:
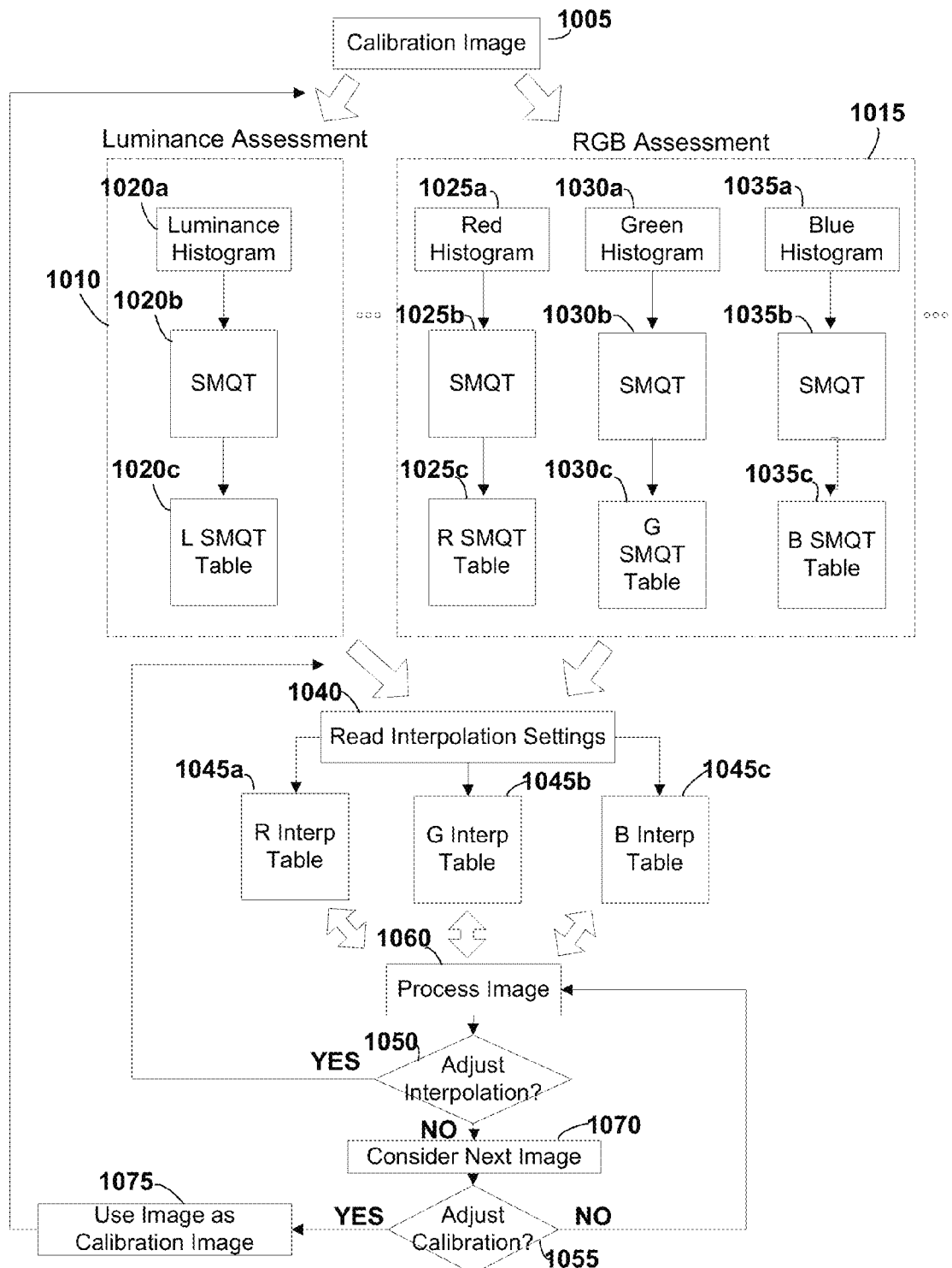
FIG. 10 is an informal block diagram depicting the generation and usage of interpolation tables as may apply in some embodiments.

FIG. 10 is an informal block diagram depicting the generation and usage of interpolation tables as may apply in some embodiments. An image to be used for calibration may be received at block 1005. The system may break this image into, e.g., a luminance assessment 1010 and an RGB assessment 1015. Additional attributes may be considered in some embodiments, e.g., a CMYK representation. In this example, in luminance assessment 1010, the system generates a luminance histogram 1020a, applies the histogram-based SMQT at block 1020b, and generates an $L_{SMQT}$ table 1020c as described herein. In the RGB assessment 1015, similar tables may be created. Particularly, red, green, and blue histograms 1025a, 1030a, 1035a may be generated, histogram-based SMQTs 1025b, 1030b, 1035b applied and tables 1025c, 1030c, 1035c generated.

With the tables 1020c, 1025c, 1030c, 1035c, the system may consult the interpolation settings 1040 to generate "interpolation tables" which can be used to rapidly modify a new, incoming image. In this example, interpolation tables for red 1045a, green 1045b, and blue 1045c have been created (one will recognize that separate interpolation tables are depicted for comprehension and that a single table receiving an input pixel value and outputting an output pixel value may likewise be generated). A luminance interpolation table (not shown) may also be generated in some embodiments (e.g., where luminance values are to be received). The system may reference the interpolation tables as it processes an image 1060 (e.g., the calibration image or a subsequent image). In this manner the image may be rapidly processed, without having to perform expensive computations. If the interpolation parameter is adjusted 1050, the system may recalculate the interpolation tables. Similarly, if a calibration adjustment is requested 1050 the system may recalculate the SMQT and interpolation tables with a new image 1070 as the calibration image 1075. Otherwise, the system may continue to process subsequent images 1070 using the existing interpolation tables.

Though not depicted in this example, one will readily recognize that additional tables may be included when generating the interpolation tables. For example, as discussed above, the system may take a 3-way weighting of the luminance, RGB, and original image values to derive the output value. In this situation, an additional table (or in-memory copy) of the original image values may also be referenced when generating the interpolation tables 1045a, 1045b, and 1045c.

User and Application Interface

Figure 11:
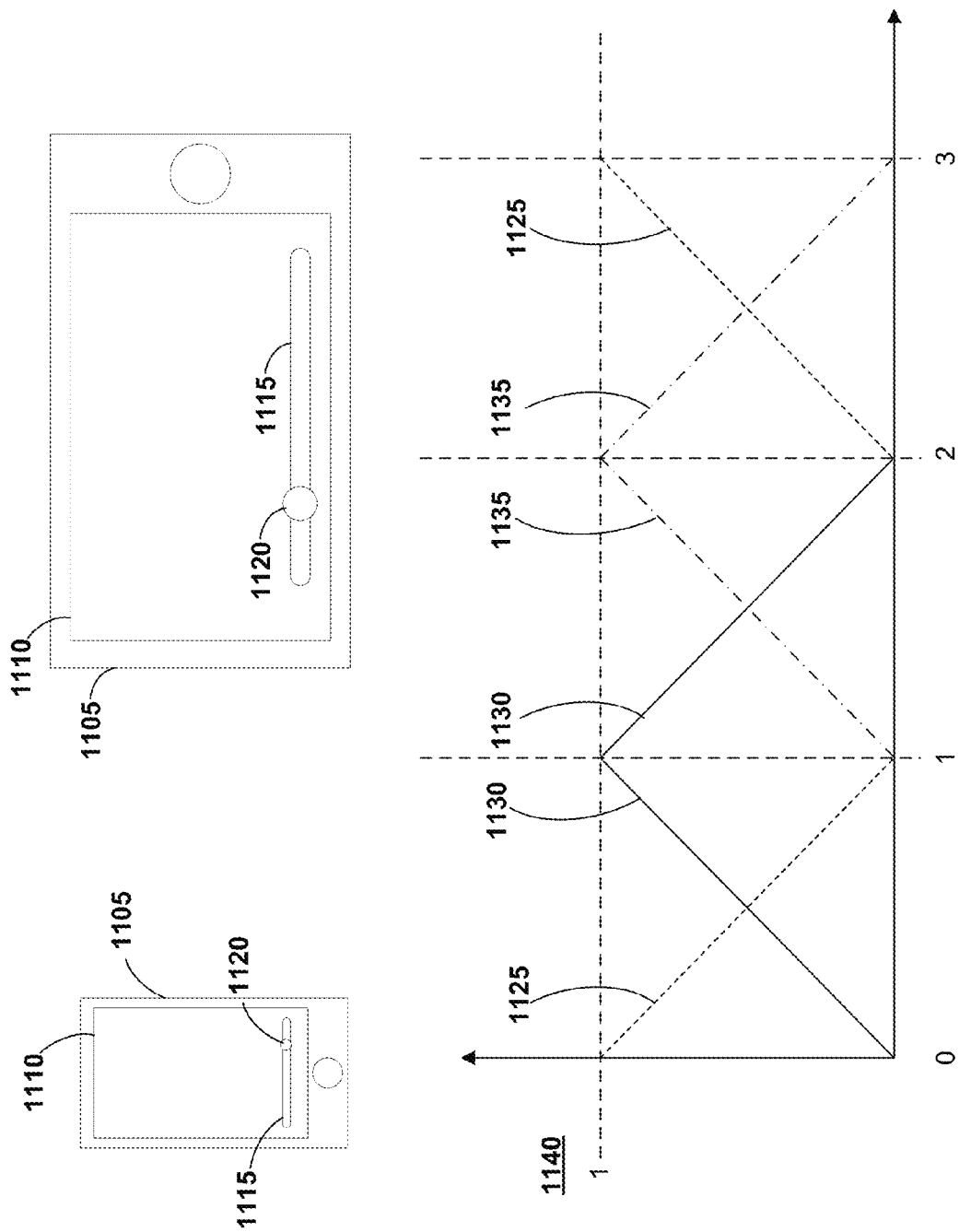
FIG. 11 is an example depiction of linear slider values as may be used to control interpolation in some embodiments.

FIG. 11 is an example depiction of linear slider values as may be used to control interpolation in some embodiments. For example, given a user device 1105 (e.g., a mobile phone) the system may present a slider 1115 on a touch screen 1110, with a tab 1120 indicating a current interpolation value. The interpolation value may be used to determine how to generate (or retrieve) the appropriate interpolation table. The plot 1140 depicts how the interpolation parameter may be set to reflect the relative influence of the original image's values 1125, the luminance determination's values 1130, and the RGB determination's values 1135.

For example, the slider 1115 may reflect a range of values from 0 to 3. At the value 0 or 3, only an original image 1125 is depicted (e.g., prior to any processing) on the touch screen 1110. At the value 1, the image processed exclusively using the luminance determination 1130 is depicted on the touch screen 1110. Finally, at the value 2, the image processed exclusively using the RGB determination 1135 is depicted on the touch screen 1110. At positions intermediate these integer values, some percentage of the different determinations is applied to generate the image on the touch screen 1110. For example, at the value 1.5, an interpolated image is produced on the touch screen 1110 using none of the original image's values, but rather values interpolated equally (weights of 0.5 applied to each) between the luminance 1130 and RGB 1135 determinations.

One will recognize that the depicted interface is merely an example and that the ranges and interpolation percentages can be exchanged and modified. Additionally, though a linear slider is depicted here, a circular slider could be used instead, such that user inputs are taken modulo 3. In this manner, as the user slides their finger around the circle the system continues to display interpolated outputs at each of the possible settings. Additionally, though only two interpolations are considered at a time in this example, one will recognize variations where more than two determinations are interpolated to produce an output image.

Sampling Overlay

Figure 12:
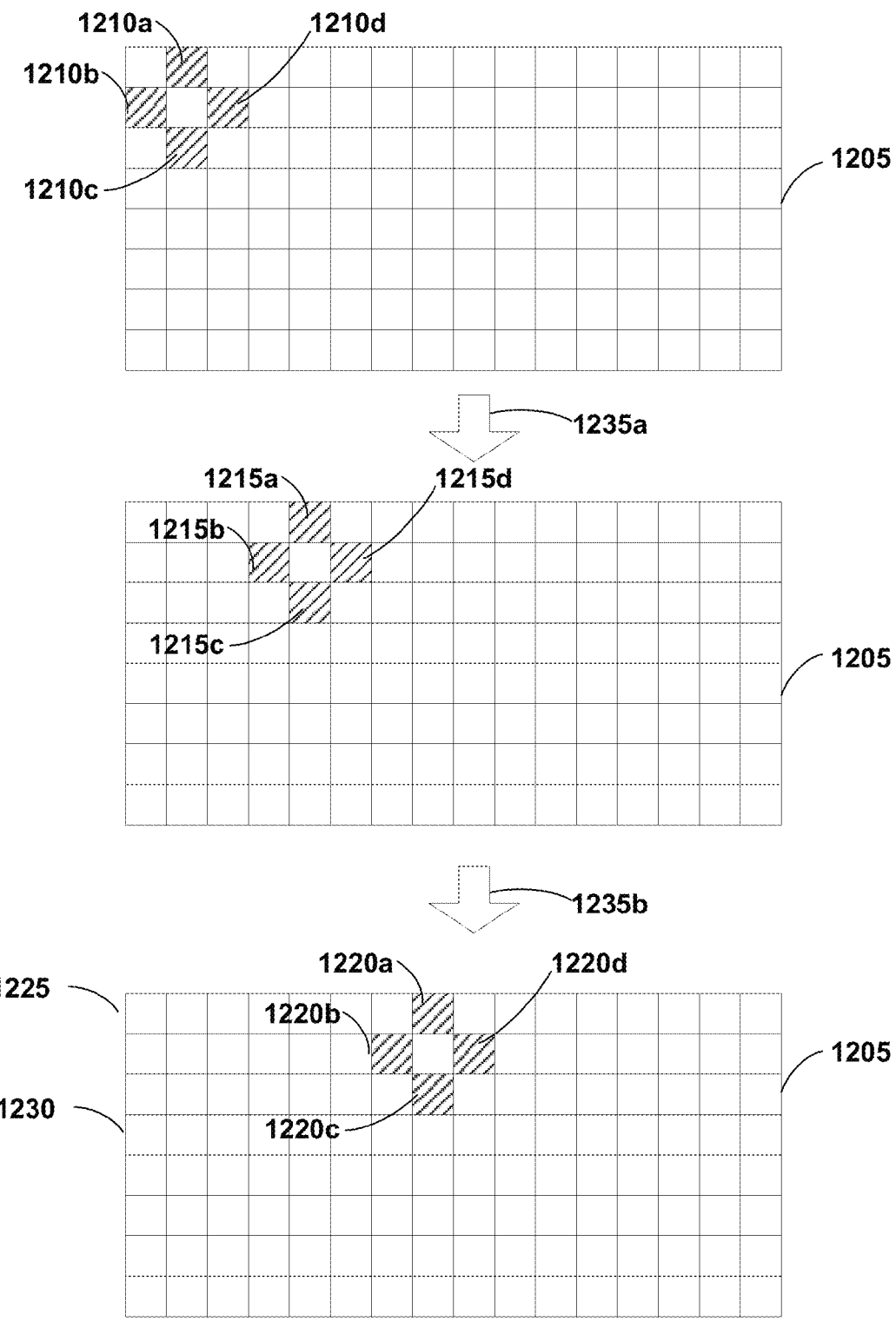
FIG. 12 is a an example depiction of a pattern overlay to select pixels for processing as may be applied in some embodiments.

FIG. 12 is a an example depiction of a pattern overlay to select pixels for processing as may be applied in some embodiments. Rather than sample each and every pixel of image 1205 to generate a histogram, in some embodiments the system may only sample pixels occurring at positions in an overlay. For example, an overlay comprising four pixels is applied in FIG. 12. Initially, only pixels at the positions 1210a-d are sampled, as only they fall under the overlay. The overlay may then be moved 1235a and the pixels 1215a-d sampled. The overlay may continue to be offset 1235b based upon its dimensions and additional pixels 1220a-d sampled. Once the overlay has traversed the rows 1225a-c it may be offset down three rows and process the rows 1230a-c. Thus, in this particular example, ⁴⁄₉ of the total pixels are used to generate the histograms. One will recognize that many different overlays may be used, and the processing need not occur in the linear fashion depicted here. Rather, the overlay may be applied in parallel at various positions across the image. In some embodiments, the overlay may be multiplied with a frequency representation of the image to inferentially derive the various channel histograms. Additional variations will be recognized by one skilled in the art.

Applications to Streaming Media

Figure 13:
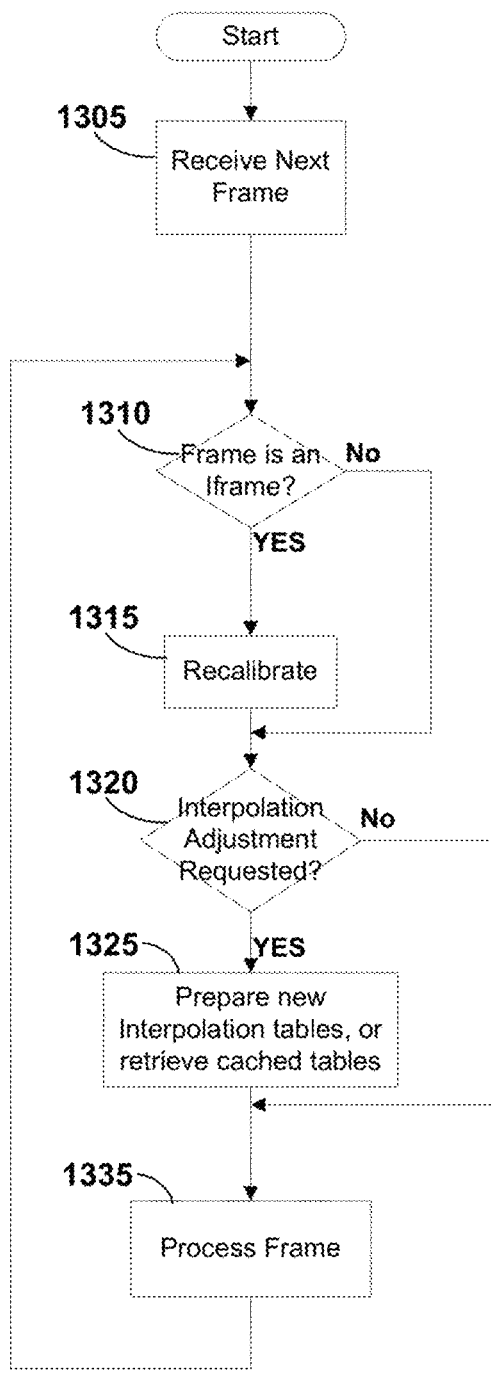
FIG. 13 is a flow diagram depicting the application of certain embodiments in an MPEG streaming context.

FIG. 13 is a flow diagram depicting the application of certain embodiments in an MPEG streaming context. At block 1305 a system, for example, a decoder, may receive a next frame. In an MPEG stream, the frame may be, e.g., a P, B, or I frame. If the frame is determined to be an I frame at block 1310 the system may perform a recalibration 1315, e.g., as discussed in FIG. 10 at blocks 1005 or 1075 using the I frame. In some embodiments, the system may not always perform a recalibration at the I frame, but may determine whether the I frames is sufficiently different from a previously received frame to warrant recalibration, or a reassessment of interpolation. If, at block 1320, an interpolation adjustment is desired, the system may generate new (or retrieve stored) interpolation tables 1325 to be used when processing the frame. At block 1335 the frame may be processed using the current interpolation table(s).

One will recognize that processing of a B or P frame may involve reference to the values of another frame. Accordingly, in embodiments where recalibration is to be applied to these frames, the system may retrieve the corresponding portions of the referenced frames before performing calibration and generating new SMQT and interpolation tables.

Applications in Alternative Imaging Environments

Figure 14:
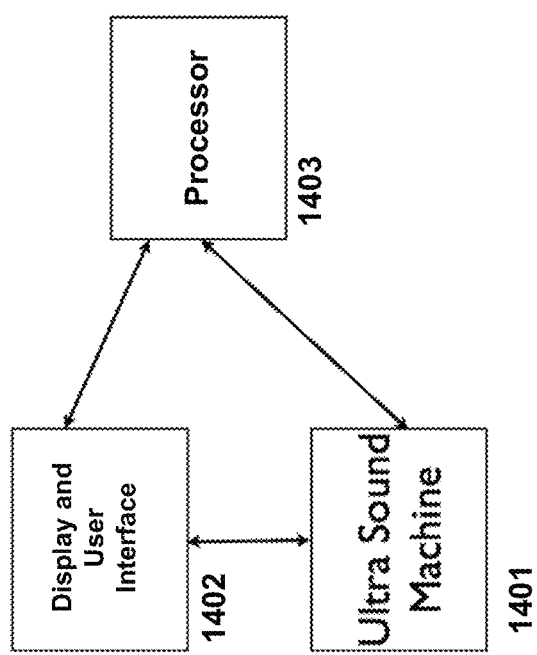
FIG. 14 is a block diagram of an example implementation in an ultrasound context of some of the disclosed embodiments.

FIG. 14 is a block diagram of an example implementation in an ultrasound context of some of the disclosed embodiments. An image frame source is not limited to being obtained from a traditional image capture device such as an optical camera. In some embodiments, any device that can produce an image may be considered. A non-traditional image capture device such as a ultra-sound machine is described in FIG. 14. Machine 1401 captures images using Ultra Sound technology. These images may be displayed on interface 1402 and parameters for the capture may be controlled by an operator. The operator may analyze the images on the display, may include multiple operators, and need not be a human operator in some embodiments. The operator can in control the location of the image capture in some embodiments. In some embodiments, interface 1402 is split into one display entity and one user interface entity. In some implementations machine 1401 can send the captured image to processor 1403. Processor 1403 may process the captured image and enhance the image and send it to display interface 1402.

The operator can control the parameter(s) of processor 1403 and/or some parameter(s) may be preset. Though FIG. 14 describes processor 1403 as being separate from machine 1401 and interface 1402, in some implementations, processor 1403 can be integrated in machine 1401 or/and interface 1402. In some embodiments, processor 1403 can be part of a package containing other products implemented in software or/and hardware. The package can be integrated in processor 1403 or/and interface 1402 or connected to machine 1401 and interface 1402 in a similar fashion as processor 1403 but not limited to.

Examples of other nontraditional image capture devices than Ultra Sound include X-ray imaging, Magnetic resonance imaging, infrared cameras, sonar used to map distant objects and surfaces such as objects in space and the seafloor and radar, etc. In some embodiments, the image enhancement process may be applied to only a portion of an image. For example, only a region of interest, such as a human face. Only the image data in this part of the image may be considered for the histograms and subsequent image enhancement processing in these embodiments.

Parallel Processing

As discussed herein, the same MQU hardware/firmware/software component may be used successively to generate a full SMQT analysis (e.g., as described for MQUs 710, 720, 730, etc.). In some embodiments, many parallel MQUs may be used however, and different channels may be simultaneously processed. For example, during calibration, parallel hardware/software/firmware may be available to simultaneously generate the red SMQT table, the blue SMQT table, the green SMQT table, and the luminance SMQT table. Once these tables are generated, the same, or a new set of parallel hardware/software/firmware may be used to generate the interpolation tables. Similarly, histogram generation for each SMQT table may also proceed in parallel, with separate hardware/software/firmware simultaneously generating histograms for the red, green, blue, and luminance channels.

Figure 15:
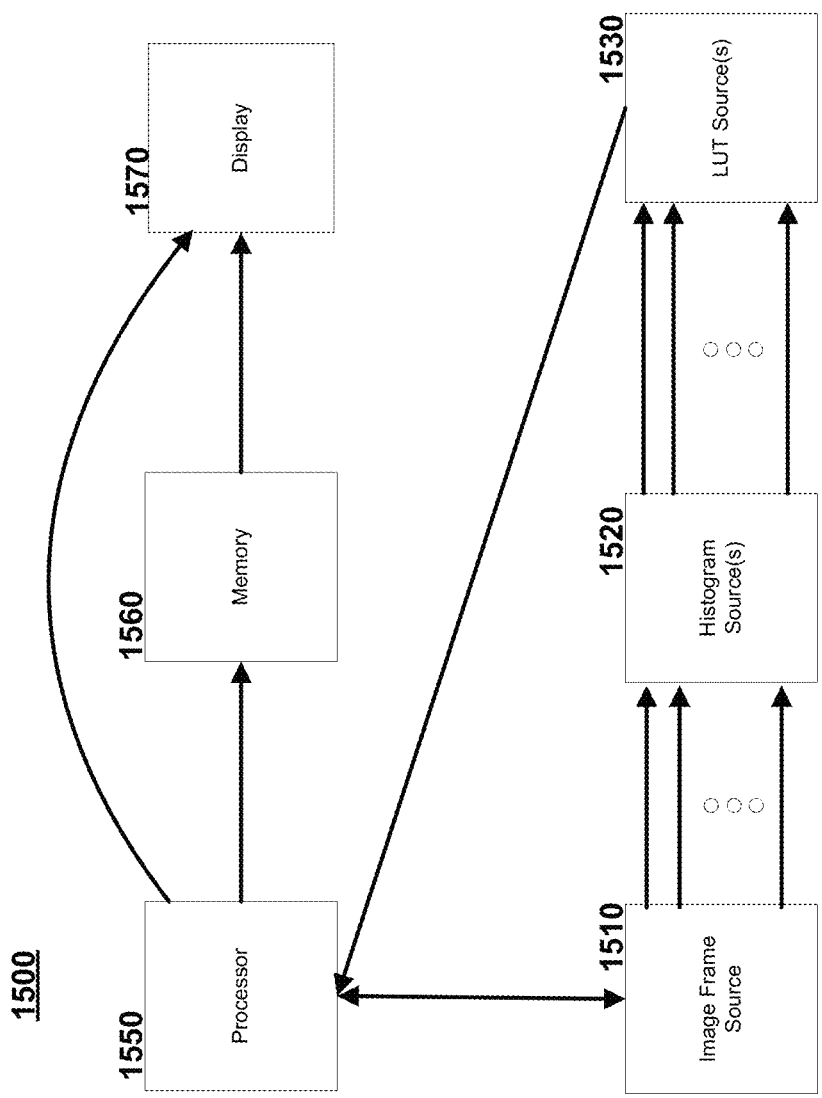
FIG. 15 is a block diagram of various in-parallel operations as may occur in some embodiments.

FIG. 15 is a block diagram of various in-parallel operations as may occur in some embodiments. Generally, a processor 1550 may cause an image frame source 1510, e.g., received from a camera, to be processed in parallel into a plurality of histogram generating components. The resultant histogram sources 1520 may then be processed in parallel to generate the SMQT LUT and, in some embodiments, the interpolation LUTs 1530. The LUTs may then be used to process the initial or subsequent images as discussed herein, storing the results in memory 1560 and/or displaying the results on a display 1570.

Thus, where the source 1510 consists of individual pixels, multiple pixels may be processed in parallel. This also means that in some embodiments source 1510 need not have access to all the image data for source 1520 to start processing. This may be particularly useful in a system where the image frame data is delivered in bursts or where parts of the image frame data are available at different points in time.

Processing Variations

Data processing systems implementing various embodiments may comprise a processor and memory (see for example, von Neumann architecture). The processor, memory, and communication channels between them can be local, distributed, integrated, etc. In some implementations, the modules in the diagram may be implemented as an integrated device, e.g. an Image Signal Processor, and/or smartphone with an at least one camera and a software applications. In other implementations, the modules may be implemented as a distributed system, hosted by multiple devices connected by a network, such as Personal Area Network (PAN), Local Area Network (LAN), Wide Area Network (WAN).

In some embodiments, the calibration process may be performed substantially before the rest of the modules are assembled together. The calibration and interpolation processes can be performed with human interaction and/or by a machine without human interaction. In some embodiments, a machine learning methodology may be used to determine appropriate calibration and interpolation settings for a given imaging condition (e.g., by analyzing human ratings after observing images at different lighting conditions processed with different calibration and/or interpolation parameters).

In some implementations, the calibration process may produce multiple sets of coefficients to accommodate various image capture and processing conditions, such as 8 vs 12-bit images or 4 vs 8 vs 12 binary tree levels. During the runtime, the system may be enabled to select a coefficient set that matches a particular set of conditions. In some embodiments, the processed images may be passed to artificial intelligence (AI) applications for image recognition. For example, a neural network component may receive outputs from the enhancement process.

Implementation Variations

In some embodiments, the image enhancement processing can implemented for certain environment conditions, such as a manned or unmanned aerial vehicle, a self-driving-car, a car, a gaming device, a motion sensing device, object recognition systems, etc. Various of the disclosed embodiments can be implemented in hardware, e.g., Field Programmable Arrays, application-specific integrated circuits, integrated circuits, discrete circuits, System-on-Chip designs, etc. Some embodiments may be integrated together with an image capture device in hardware, e.g., an image sensor. Some embodiments can be implemented as a combination of hardware and software, where some parts run in hardware and some in software.

Computer System

Figure 16:
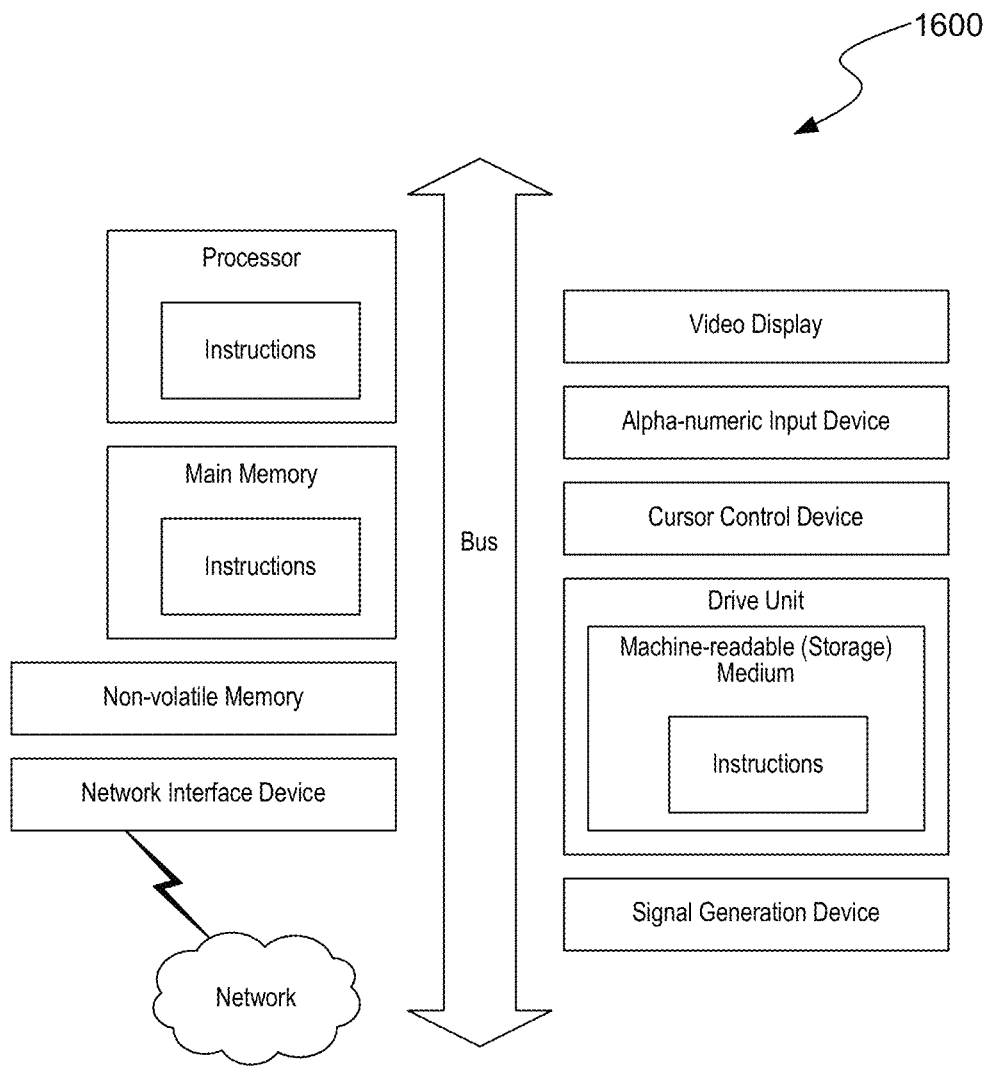
FIG. 16 shows a diagrammatic representation of a machine in the example form of a computer system within which a set of instructions for causing the machine to perform any one or more of the methodologies discussed herein may be executed.

FIG. 16 shows a diagrammatic representation of a machine 1600 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links. The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The network interface device enables the machine 1600 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

The invention claimed is:

1. A computer-implemented method comprising:
    obtaining a first image;
    generating a first histogram for a first attribute associated with pixels in the first image;
    generating a second histogram for a second attribute associated with pixels in the first image;
    generating a first Successive Mean Quantization Transform (SMQT) output using the first histogram; and
    generating a second SMQT output using the second histogram; and
    generating an interpolation look-up-table based at least in part upon the first SMQT output, the second SMQT output, and an interpolation parameter; and
    adjusting a pixel in a second image using the interpolation look-up-table.

2. The computer-implemented method of claim 1, wherein generating a first SMQT output comprises generating an SMQT table for a first attribute.

3. The computer-implemented method of claim 1, wherein the first attribute is one of a red, green, or blue pixel value attribute and the second attribute is a luminance value attribute.

4. The computer-implemented method of claim 1, wherein the first attribute comprises a red pixel value attribute and the second attribute comprises a luminance pixel value attribute, the method further comprising:
    generating a third histogram for a green pixel value attribute;
    generating a fourth histogram for a blue pixel value attribute;
    generating a third SMQT output using the third histogram; and
    generating a fourth SMQT output using the fourth histogram, and wherein
    the generation of the interpolation look-up-table is further based upon the third SMQT output and the fourth SMQT output, the interpolation look-up-table specifying an RGB output value for a given RGB input value.

5. The computer-implemented method of claim 1, wherein the first SMQT output is derived from an SMQT comprising 8 levels and the second SMQT output is derived from an SMQT comprising 8 levels.

6. The computer-implemented method of claim 1, wherein generating a first histogram for a first attribute associated with pixels in the first image comprises iterating over less than all of the pixels in the image.

7. The computer-implemented method of claim 1, wherein the interpolation parameter is received from a human user.

8. A non-transitory computer-readable medium comprising instructions configured to cause at least one processor to perform a method, comprising:
    obtaining a first image;
    generating a first histogram for a first attribute associated with pixels in the first image;
    generating a second histogram for a second attribute associated with pixels in the first image;
    generating a first SMQT output using the first histogram; and
    generating a second SMQT output using the second histogram; and
    generating an interpolation look-up-table based at least in part upon the first SMQT output, the second SMQT output, and an interpolation parameter; and
    adjusting a pixel in a second image using the interpolation look-up-table.

9. The non-transitory computer-readable medium of claim 8, wherein generating a first SMQT output comprises generating an SMQT table for the first attribute.

10. The non-transitory computer-readable medium of claim 8, wherein the first attribute is one of a red, green, or blue pixel value attribute and the second attribute is a luminance value attribute.

11. The non-transitory computer-readable medium of claim 8, wherein the first attribute comprises a red pixel value attribute and the second attribute comprises a luminance pixel value attribute, the method further comprising:
    generating a third histogram for a green pixel value attribute;
    generating a fourth histogram for a blue pixel value attribute;
    generating a third SMQT output using the third histogram; and
    generating a fourth SMQT output using the fourth histogram, and wherein the generation of the interpolation look-up-table is further based upon the third SMQT output and the fourth SMQT output, the interpolation look-up-table specifying an RGB output value for a given RGB input value.

12. The non-transitory computer-readable medium of claim 8, wherein the first SMQT output is derived from an SMQT comprising 8 levels and the second SMQT output is derived from an SMQT comprising 8 levels.

13. The non-transitory computer-readable medium of claim 8, wherein generating a first histogram for a first attribute associated with pixels in the first image comprises iterating over less than all of the pixels in the image.

14. The non-transitory computer-readable medium of claim 8, wherein the interpolation parameter is received from a human user.

15. A computer system, comprising:
one or more hardware modules configured to:
receive a first image;
generate a first histogram for a first attribute associated with pixels in the first image;
generate a second histogram for a second attribute associated with pixels in the first image;
generate a first SMQT output using the first histogram; and
generate a second SMQT output using the second histogram; and
generate an interpolation look-up-table based at least in part upon the first SMQT output, the second SMQT output, and an interpolation parameter; and
adjust a pixel in a second image using the interpolation look-up-table.

16. The computer system of claim 15, wherein generating a first SMQT output comprises generating an SMQT table for the first attribute.

17. The computer system of claim 15, wherein the first attribute is one of a red, green, or blue pixel value attribute and the second attribute is a luminance value attribute.

18. The computer system of claim 15, wherein the first attribute comprises a red pixel value attribute and the second attribute comprises a luminance pixel value attribute, the method further comprising:
generating a third histogram for a green pixel value attribute;
generating a fourth histogram for a blue pixel value attribute;
generating a third SMQT output using the third histogram; and
generating a fourth SMQT output using the fourth histogram, and wherein
the generation of the interpolation look-up-table is further based upon the third SMQT output and the fourth SMQT output, the interpolation look-up-table specifying an RGB output value for a given RGB input value.

19. The computer system of claim 15, wherein the first SMQT output is derived from an SMQT comprising 8 levels and the second SMQT output is derived from an SMQT comprising 8 levels.

20. The computer system of claim 15, wherein generating a first histogram for a first attribute associated with pixels in the first image comprises iterating over less than all of the pixels in the image.

21. The computer system of claim 15, wherein the interpolation parameter is received from a human user.

* * * * *